United States Patent [19]

Wood

[11] Patent Number: 5,283,837
[45] Date of Patent: Feb. 1, 1994

[54] ACCURATE ESTIMATION OF SURFACE NORMALS IN 3-D DATA SETS

[75] Inventor: Christopher H. Wood, Cleveland, Ohio

[73] Assignee: Picker International, Inc., Highland Hts., Ohio

[21] Appl. No.: 750,812

[22] Filed: Aug. 27, 1991

[51] Int. Cl.$^5$ .............................................. G06K 9/00
[52] U.S. Cl. ........................................ 382/6; 382/54; 378/901; 378/98.2; 364/413.14
[58] Field of Search ............... 382/1, 6, 41, 54, 44–47; 378/901; 358/111; 364/413.14, 413.16, 413.17, 413.18, 413.21, 413.22

[56] References Cited

U.S. PATENT DOCUMENTS

| | | | |
|---|---|---|---|
| 4,707,786 | 11/1987 | Dehner | 382/6 |
| 4,761,819 | 8/1988 | Denison et al. | 382/6 |
| 4,899,393 | 2/1990 | Morishita et al. | 382/6 |

*Primary Examiner*—Jose L. Couso
*Attorney, Agent, or Firm*—Fay, Sharpe, Beall, Fagan, Minnich & McKee

[57] ABSTRACT

A CT scanner or other medical diagnostic imager (A) generates data which is reconstructed (B) into a three-dimensional image representation that is stored in an image memory (C). Points on a surface (10) of a selected subregion, such as the surface of an internal organ, in the three-dimensional image representation are determined (12) which are visible from and correspond to pixels on a viewing plane (14). For each viewable point on the surface, a mean variation along an x, y, and z-coordinate system with its origin at the surface point in question is determined (20). A covariance matrix whose matrix elements along the diagonal are indicative of a rate of variance along each axis and whose other matrix values are indicative of a rate of variance relative to pairs of axes is defined (20). A rate of most rapid change through the 3D data is determined (22), by eigenvalue decomposition (24) of the covariance matrix. A vector along the rate of most rapid change is normalized (26). Gray scale shading for a pixel of a man-readable display (E) corresponding to the surface point is determined (28). In the preferred embodiment, the gray scale shading is proportional to the cosine of the angle between the normalized vector in a direction of most rapid gray scale change and a light source vector. In this manner, the surface normal to a surface at the points which correspond to each pixel of an image display are efficiently determined and provided with an appropriate gray scale value to make the two-dimensional image display appear as if it were three-dimensional.

18 Claims, 3 Drawing Sheets

ACCURATE ESTIMATION OF SURFACE NORMALS IN 3-D DATA SETS

BACKGROUND OF THE INVENTION

The present invention relates to the image display arts. It finds particular application in conjunction with providing surface shading for 3-D presentations of diagnostic medical images on video monitors and will be described with particular reference thereto. However, it is to be appreciated that the invention finds application in other areas, including providing surface shading in other 3-D displays, determining normals to surfaces, interfaces, or contours in computer or mathematical data, and the like.

Heretofore, three-dimensional appearing images of internal organs have been projected from CT and other medial diagnostic data. That is, shading is added to a video or other two-dimensional display to give the effect of depth in the direction perpendicular to the screen. Commonly, a planar array of pixels or viewing plane is defined relative to the three-dimensional array of the medical diagnostic data. Typically, the three-dimensional array of diagnostic data is characterized by gray scale values corresponding to each of a three-dimensional rectangular array of data points or voxels. The organ of which a three-dimensional appearing display is to be generated is typically buried within the data. Each pixel of the viewing or image plane is projected orthogonal to the viewing plane into the data. Each time the ray crosses into another voxel, the voxel gray scale value is compared with threshold gray scale values for the organ of interest. From the depth at which each ray intersects the organ and whether a ray intersects the organ at all, a map is generated of the surface contour of the organ when viewed from the viewing plane. Of course, because each of the voxels has a similar gray scale level, displaying this image would look more like a silhouette than a three-dimensional display.

To give meaning to the surface contour, shading is added to the exposed surfaces of the image. Several methods have been developed in the prior art for adding shading to medical and other three-dimensional images. These methods include depth shading, depth gradient shading, gray scale level gradient shading, and rendering with polygonal shapes. In depth shading, the simplest of these methods, the gray scale value of each voxel is displayed in inverse proportion to the distance from the viewing plane to the voxel at which the orthogonal ray intersected the organ of interest. The depth shading technique produces almost no fine detail on the surface, hence, has limited diagnostic value.

The other three methods each attempt to estimate the direction of the organ surface relative to the viewing plane orthogonal rays at each point of intersection. In depth gradient shading, an estimate of the surface inclination relative to the orthogonal ray from the viewing plane is determined by gradient operators on the depth image. Gray scale shading is added to each voxel in accordance with this angle of inclination. While the inclusion of surface inclination for shading improves the appearance of the images, gradient operators provide a relatively coarse quantization of the surface angles. That is, the surface normals estimated by this technique are not accurate which degrades the resultant image quality.

The image quality can be improved using the gray scale gradient shading techniques. In this technique, the gradient of the gray scale level along the surface is used to estimate the surface normal, rather than using depth or angle of the voxel surface. The estimation of the gradient in the voxel data can be performed using a number of operators of varying size. The high dynamic range of gray scale levels within a small spacial neighborhood produces superior image quality. However, this technique is unable to handle thin structures and it is inaccurate when estimating the surface normal in noisy images, i.e. when the signal to noise ratio is low.

In the polygonal shaped rendering technique, the data is pre-processed and the surface approximated with a set of polygons, e.g. triangles. The surface normal is readily computed as each polygon as being defined. In the Cuberille method, each surface voxel is treated as a small cube. The faces of the cube are output as small squares projected on the viewing screen. These polygon techniques have problems handling branching structures and tend to eliminate fine detail, especially when the polygons are large compared in size with a voxel.

The present invention contemplates a new and improved technique for determining surface normals.

SUMMARY OF THE INVENTION

In accordance With one aspect of the present invention, a point on the surface is selected. A variation among gray scales values along a plurality of lines or axes through the point is determined. A direction along which the variation changes most rapidly is determined and the normal is set along the maximum variation direction.

In accordance with a more limited aspect of the present invention, the variance is determined along orthogonal axes and the variance is laid in matrix format. The normal is determined by determining the direction along which the gray scale values change most quickly.

In accordance with a still more limited aspect of the present invention, the direction of greatest variance is determined by an eigenvalue decomposition of the matrix.

In accordance with a yet more limited aspect of the present invention, a dot product of the normal vector and vector identifying the light source is taken is determined a cosine of the angle therebetween. Gray scale shading of the surface is determined in accordance with the determined cosine, e.g. proportional to the cosine.

One advantage of the present invention is the precision with which it defines surface normals.

Another advantage of the present invention resides in its flexibility in handling images with different amounts of noise. The size of the neighborhood over which the normal is calculated is readily adjusted.

Another advantage of the present invention resides in its computational efficiency.

Still further advantages of the present invention will become apparent to those of ordinary skill in the art upon reading and understanding the following detailed description.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
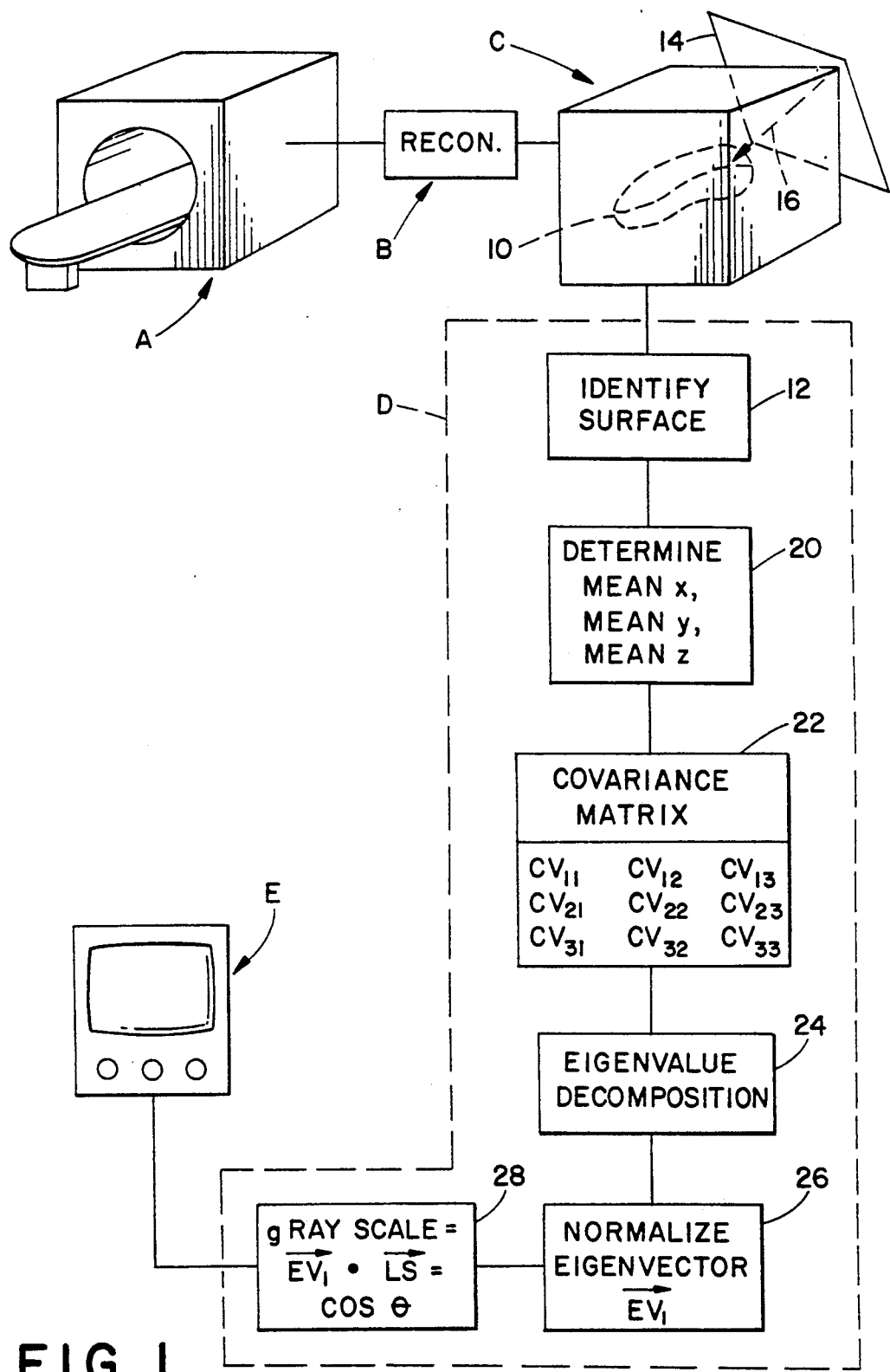
FIG. 1 is a diagrammatic illustration of the present invention.

A medical diagnostic scanner, such as a CT or MRI scanner, or other source of image data A generates raw data sets or views. A reconstruction means B reconstructs the raw data into a multi-dimensional image representation. In the preferred embodiment, the image representation includes a multiplicity of gray scale values each of which corresponds to one of a multiplicity of voxels arranged in a three-dimensional rectangular array, each of the voxels being of like size. The gray scale values are stored in a memory means C from which they are retrievable by addressing the memory with corresponding orthogonal addresses (x,y,z). A three-dimensional image generating means D identifies a region of data corresponding to a preselected portion or object 10 within the three-dimensional image representation, adds surface shading, and produces an output signal to a video monitor E or other man-readable display on which the 3D data is viewed. That is, the video monitor E produces a two-dimensional image with appropriate surface shading such that the image appears three-dimensional to the human eye.

The image generating means D includes a surface determining means 12 which identifies a portion of the surface of the object 10 that is visible from a selected viewing direction. For example, a viewing plane 14 having pixels corresponding to the display pixels on the video monitor E is defined relative to the three-dimensional image representation in the memory 0. That is, the plane defines a viewing window through which the operator is going to look into the three-dimensional image representation. A ray 16 is projected perpendicular to the image plane from each display pixel into the three-dimensional image representation. Each time the ray intersects a voxel, the gray scale value or other reconstructed property of the tissue in that voxel is compared with a reference value. Based on the comparison, the voxel is either determined to be on the surface of the selected object or treated as transparent material through which the viewer can see. For example, the three-dimensional image representation might correspond to a chest cavity region that includes the liver. The gray scale value corresponding to each voxel that the ray intersects is compared with the gray scale value corresponding to the liver. Intervening tissue and bone, having different gray scale values, is effectively set to zero or treated as transparent air such that the displayed image will only show the surface of the liver. By repeating the process with each display pixel, a set of data $g(x,y,z)$ which defines the surface of the liver or other selected region of interest is defined. To rotate the image, the image plane is progressively redefined at angular positions around the axis of rotation and the process repeated. Preferably, the intersection points between the rays and the voxels which mark the surface of the liver or other subregion of interest includes high order interpolation, such as tri-linear interpolation, to attain sub-voxel accuracy.

Figure 2:
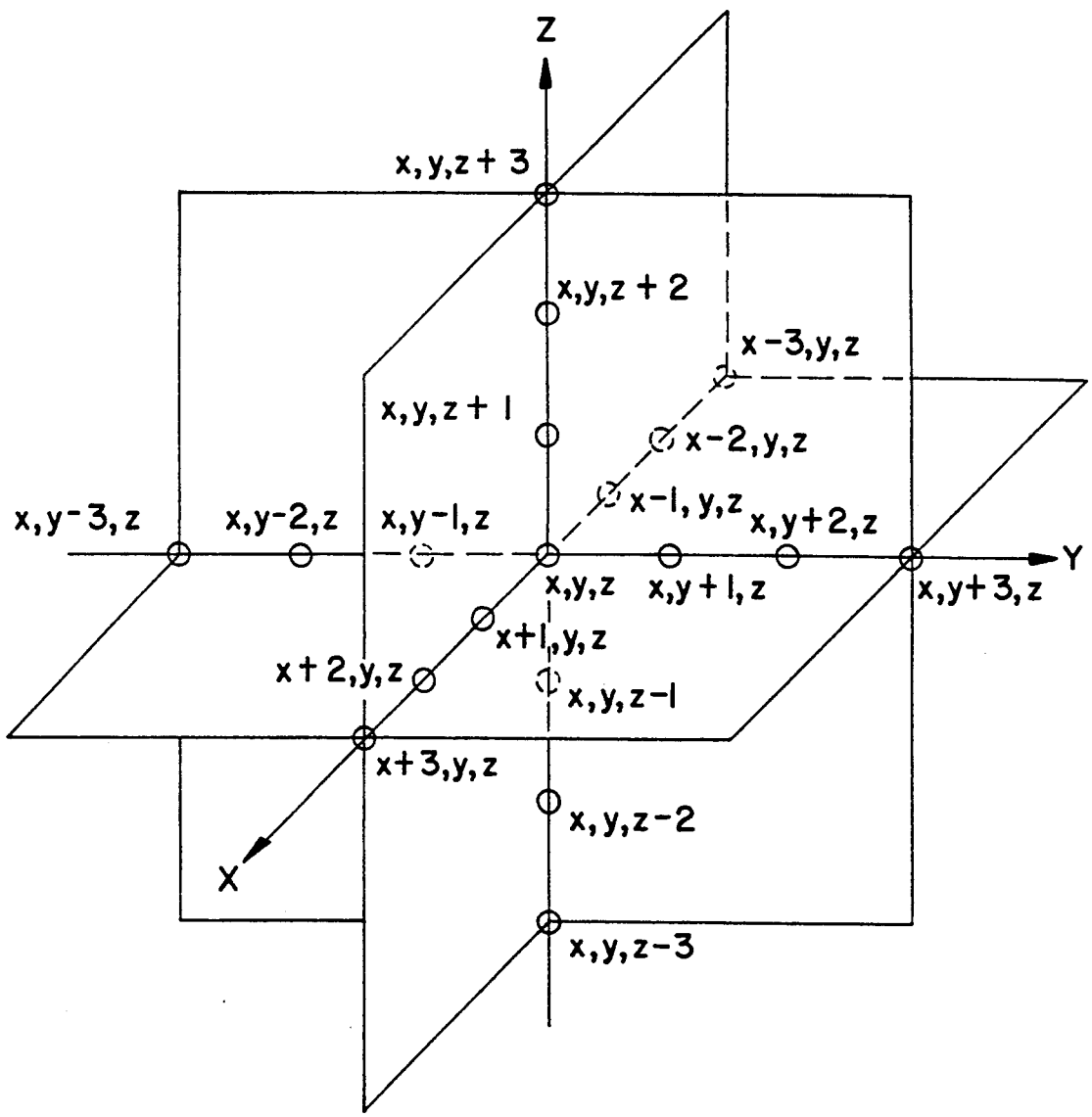
FIG. 2 is illustrative of an exemplary set of points whose variance is considered when determining the surface normal at point (x,y,z)

With continuing reference to FIG. 1 and further reference to FIG. 2, an averaging means 20 determines the mean of n most closely adjacent pixels along each of the x, y, and z-axes. In the illustrative example of FIG. 2, n=3. Using interpolation and floating point values for x, y, and z, the mean gray scale along the x, y, and z-axes, mean$_x$, mean$_y$, and mean$_z$, respectively, is:

$$\text{mean}_x = \frac{1}{(2n+1)} \sum_{i=-n}^{i=n} g(x+i,y,z), \tag{1a}$$

$$\text{mean}_y = \frac{1}{(2n+1)} \sum_{i=-n}^{i=n} g(x,y+i,z), \tag{1b}$$

$$\text{mean}_z = \frac{1}{(2n+1)} \sum_{i=-n}^{i=n} g(x,y,z+i). \tag{1c}$$

A covariance matrix cv is generated by a means 22 from the surface $g(x,y,z)$ and the mean gray scale values mean$_x$, mean$_y$, and mean$_z$. The diagonal values of the covariance matrix each represent a variance or average deviation of the gray scale values along one of the x, y, and z-axes relative to the mean along that axis, i.e.

$$cv_{11} = \frac{1}{(2*n+1)} \sum_{i=-n}^{i=n} [g(x+i,y,z) - \text{mean}_x]^2, \tag{2a}$$

$$cv_{22} = \frac{1}{(2*n+1)} \sum_{i=-n}^{i=n} [g(x,y+i,z) - \text{mean}_y]^2, \tag{2b}$$

$$cv_{33} = \frac{1}{(2*n+1)} \sum_{i=-n}^{i=n} [g(x,y,z+i) - \text{mean}_x]^2. \tag{2c}$$

The off-diagonal matrix values represent the relative deviation from the mean along corresponding pairs of axes, i.e.

$$cv_{12} = \frac{1}{(2n+1)} \sum_{i=-n}^{i=n} [g(x+i,y,z) - \text{mean}_x] * \tag{3a}$$

$$[g(x,y+i,z) - \text{mean}_y],$$

$$cv_{13} = \frac{1}{(2n+1)} \sum_{i=-n}^{i=n} [g(x+i,y,z) - \text{mean}_x] * \tag{3b}$$

$$[g(x,y,z+i) - \text{mean}_z],$$

$$cv_{23} = \frac{1}{(2n+1)} \sum_{i=-n}^{i=n} [g(x,y+i,z) - \text{mean}_y] * \tag{3c}$$

$$[g(x,y,z+i) - \text{mean}_z].$$

The matrix is symmetric about the diagonal, hence:

$$cv_{21} = cv_{12} \tag{4a}$$

$$cv_{31} = cv_{13} \tag{4b}$$

$$cv_{32} = cv_{23} \tag{4c}$$

In the preferred embodiment, a rate of change means 24 performs a standard eigenvalue decomposition. Eigenvalues are also called characteristic values or latent roots. The vector solution to the eigenvalue decomposition produces a first or primary eigenvector $EV_1$ in the direction of greatest change and in a secondary eigenvector $EV_2$ in the direction of greatest uniformity with the condition of being orthogonal. The eigenvectors are also known as characteristic vectors.

A normalizing means 26 adjusts the size of the primary eigenvector $EV_1$ such that it has unit length. In this manner, vector multiplication and other operations performed in conjunction with the eigenvector will affect angle, but not magnitude.

A shading gray scale determining means 28 determines the gray scale to be associated with each point of intersection between the surface $g(x,y,z)$ and the rays orthogonal to the image plane. In the illustrated embodiment, the gray scale determining means takes the vector dot product of the normalized eigenvector and the normalized vector 23 which defines direction of the light source. Of course, different light sources can be defined and the light source can be moved by the operator to optimize the display of desired surface characteristics. In the preferred embodiment, the selected gray scale is proportional to the cosine of the angle achieved by the dot product of the light source vector and the eigenvector with the corresponding image plane orthogonal ray, i.e.

$$\cos(\theta) = ev_x ls_x + ev_y ls_y + ev_z ls_z \quad (5).$$

By way of specific example, when $n=3$, Equations (2a), (2b), and (2c) become:

$$cv_{11} = \frac{1}{7} \sum_{i=-3}^{i=3} [g(x+i,y,z) - \text{mean}_x]^2, \quad (6a)$$

$$cv_{22} = \frac{1}{7} \sum_{i=-3}^{i=3} [g(x,y+i,z) - \text{mean}_y]^2, \quad (6b)$$

$$cv_{33} = \frac{1}{7} \sum_{i=-3}^{i=3} [g(x,y,z+i) - \text{mean}_z]^2, \quad (6c)$$

and Equations (3a), (3b), and (3c) become:

$$cv_{12} = \frac{1}{7} \sum_{i=-3}^{i=3} [g(x+i,y,z) - \text{mean}_x] * [g(x,y+i,z) - \text{mean}_y], \quad (7a)$$

$$cv_{13} = \frac{1}{7} \sum_{i=-3}^{i=3} [g(x+i,y,z) - \text{mean}_x] * [g(x,y,z+i) - \text{mean}_z], \quad (7b)$$

$$cv_{23} = \frac{1}{7} \sum_{i=-3}^{i=3} [g(x,y+i,z) - \text{mean}_y] * [g(x,y,z+i) - \text{mean}_z], \quad (7c)$$

where:

$$cv_{21} = cv_{12} \quad (8a),$$

$$cv_{31} = cv_{13} \quad (8b),$$

$$cv_{32} = cv_{23} \quad (8c),$$

and where:

$$\text{mean}_x = \frac{1}{7} \sum_{i=-3}^{i=3} g(x+i,y,z), \quad (9a)$$

$$\text{mean}_y = \frac{1}{7} \sum_{i=-3}^{i=3} g(x,y+i,z), \quad (9b)$$

$$\text{mean}_z = \frac{1}{7} \sum_{i=-3}^{i=3} g(x,y,z+i). \quad (9c)$$

To understand why the eigenvector decomposition of the covariance matrix is an optimum solution, consider parameter space. The coordinate axes of parameter space each correspond to gray scale values along the x, y, and z-axes of FIG. 2. The center voxel (x,y,z) has a zero offset and ones to either side have progressively greater offsets. For example, the center voxel along each axis is the same and has zero offset:

$$Gx_0 = g(x,y,z) \quad (10a),$$

$$Gy_0 = g(x,y,z) \quad (10b),$$

$$Gz_0 = g(x,y,z) \quad (10c).$$

The offset from the center voxel is used to link other voxels resulting in a total of $2n+1$ (or 7 in the present example) points mapped into parameter space. The location of these other points and parameter space are given by:

$$Gx_{-3} = g(x-3,y,z) \quad Gy_{-3} = g(x,y-3,z)$$
$$Gz_{-3} = g(x,y,z-3)$$

$$Gx_{-2} = g(x-2,y,z) \quad Gy_{-2} = g(x,y-2,z)$$
$$Gz_{-2} = g(x,y,z-2)$$

$$Gx_{-1} = g(x-1,y,z) \quad Gy_{-1} = g(x,y-1,z)$$
$$Gz_{-1} = g(x,y,z-1)$$

$$Gx_1 = g(x-1,y,z) \quad Gy_1 = g(x,y+1,z) \quad Gz_1 = g(x,y,z+1) \quad (11).$$

$$Gx_2 = g(x+2,y,z) \quad Gy_2 = g(x,y+2,z) \quad Gz_2 = g(x,y,z+2)$$

$$Gx_3 = g(x+3,y,z) \quad Gy_3 = g(x,y+3,z) \quad Gz_3 = g(x,y,z+3)$$

A straight line fit in this parameter space can be performed with a variety of methods other than the preferred eigenvector decomposition of the covariance matrix formed using the points in this space. Because $Gx_n = g(x+n,y,z)$, $Gy_n = g(x,y+n,z)$, and $Gz_n = g(x,y,z+n)$, the covariance matrix formed using the points in parameter space is equivalent to forming the covariance matrix using the equations set forth above. The eigenvector as an estimator of the surface normal is optimal.

Figure 3:
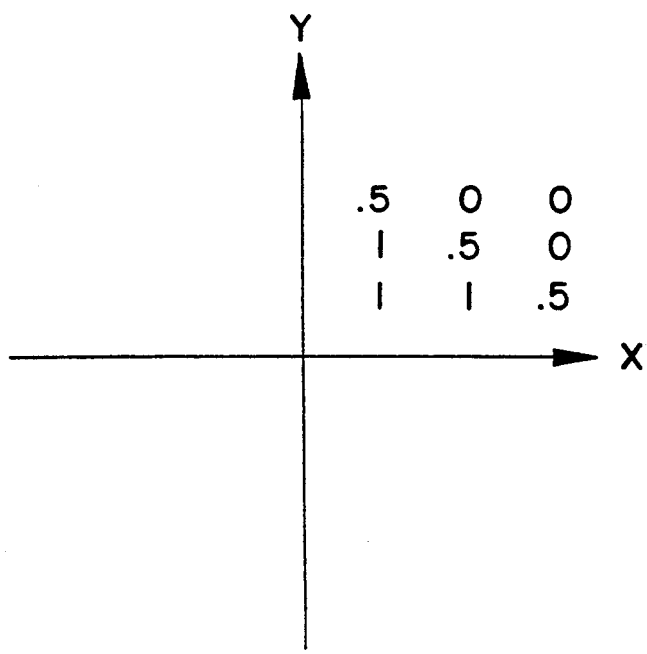
FIG. 3 is a matrix of exemplary gray scale values superimposed on corresponding (x,y) two-dimensional coordinate system for illustrating the present invention.
Figure 4:
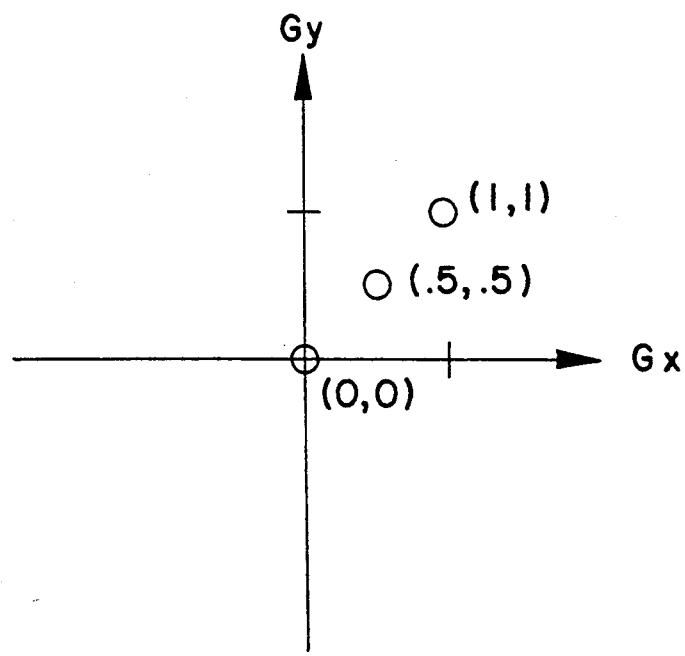
FIG. 4 illustrates the corresponding parameter space to the diagram of FIG. 3.

To further the illustration, a conventional operator can be compared to the eigenvector method in parameter space. For greater simplicity, consider the two-dimensional example illustrated in FIG. 3. In this example, the voxel values are between 0 and 1 with $n=1$. Clearly, the normal points 45° away from the x-axis. The parameter space is shown in FIG. 4. Because $n=1$, three points map into the parameter space, i.e.

$$Gx_{-1} = 1 \quad Gy_{-1} = 1$$

$$Gx_0 = 0.5 \quad Gy_0 = 0.5 \quad (12).$$

$$Gx_1 = 0 \quad Gy_1 = 0$$

In this example, it is clear that the points map in a straight line in parameter space, which is not necessarily true for most more complex real world examples. It is also clear that the lines point in the direction of the surface normal.

Analogously, in the eigenvector method, Equations (1)–(4) become:

$$\text{mean}_x = \frac{1}{3}\left(1 + \frac{1}{4} + 0\right) = \frac{5}{12}, \quad (13a)$$

-continued $$\text{mean}_y = \frac{1}{3}\left(1 + \frac{1}{4} + 0\right) = \frac{5}{12}, \quad (13b)$$

$$cv_{11} = \frac{1}{3}\left[\left(1 - \frac{5}{12}\right)^2 + \left(.5 - \frac{5}{12}\right)^2 + \left(0 - \frac{5}{12}\right)^2\right] = \frac{75}{432} = .1736, \quad (14a)$$

$$cv_{22} = \frac{1}{3}\left[\left(1 - \frac{5}{12}\right)^2 + \left(.5 - \frac{5}{12}\right)^2 + \left(0 - \frac{5}{12}\right)^2\right] = .1736, \quad (14b)$$

$$cv_{21} = cv_{12} = \frac{1}{3}\left[\left(1 - \frac{5}{12}\right)\left(1 - \frac{5}{12}\right) + \left(.5 - \frac{5}{12}\right)\left(.5 - \frac{5}{12}\right) + \left(0 - \frac{5}{12}\right)\left(0 - \frac{5}{12}\right)\right] = .1736. \quad (15)$$

The eigenvectors in this example are:

$$\vec{EV_1} = \left(\frac{1}{\sqrt{2}}, \frac{1}{\sqrt{2}}\right), \quad (16a)$$

$$\vec{EV_2} = \left(\frac{1}{\sqrt{2}}, \frac{1}{\sqrt{2}}\right). \quad (16b)$$

Because the surface normal points in the direction of the principle eigenvector $EV_1$, the surface normal sn is given by:

$$\vec{sn} = \vec{EV_1} = \left(\frac{1}{\sqrt{2}}, \frac{1}{\sqrt{2}}\right). \quad (17)$$

If a conventional gradient operator is used, such as:

$$gx = g(x-1,y) - g(x+1,y) \quad (18a),$$
$$gy = g(x,y-1) - g(x,y+1) \quad (18b),$$

the direction of the surface normal is estimated as:

$$\vec{sn} = (gx, gy) = (1,1) \quad (19),$$

which, when normalized becomes:

$$\vec{sn} = \left(\frac{1}{\sqrt{2}}, \frac{1}{\sqrt{2}}\right). \quad (20)$$

Thus, both the eigenvector decomposition and the least squares fit produce the same surface normal.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of providing gray scale shading in computer generated two dimensional surface rendering images which convey contour information concerning interior three dimensional object surfaces, the method comprising:

generating image voxel data values representing a three dimensional array of voxels of a three dimensional region of a subject;

storing the voxel data values in a computer memory;

with a computer, determining voxels of the voxel array stored in the computer memory (i) which lie on an interior surface of a selected subregion of the three dimensional region and (ii) which are visible from a viewing plane which corresponds to a two dimensional displayed image, the two dimensional displayed image being defined by a plurality of pixels;

with the computer, determining interior surface voxels of the voxel array which correspond to each of the displayed image pixels;

for each of the determined interior surface voxels, determining with the computer a variation in the voxel data along each of at least three axes;

computer generating an array of voxel data variance values indicative of a variance in the voxel data values relative to the axes;

determining with the computer a direction of most rapid change of the voxel data variance values in the array;

determining with the computer a gray scale value for each interior surface voxel in accordance with the direction of greatest change;

with an image display, displaying the two dimensional displayed image such that each displayed image pixel has the gray scale value determined for the corresponding interior surface voxel.

2. The method as set forth in claim 1 wherein the variance array generating step includes determining a mean and a variance along each axis.

3. The method as set forth in claim 2 wherein the variance array generating step includes determining a covariance matrix in which matrix values along its diagonal are indicative of variance along each of the axes and values of the matrix off the diagonal are indicative of variance relative to a plurality of axes.

4. The method as set forth in claim 3 wherein the direction of most rapid variance along the covariance matrix is determined by eigenvalue decomposition of the covariance matrix.

5. The method as set forth in claim 3 wherein the determination of the direction of most rapid variance through the matrix includes a least squares fit of a straight line through parameter space.

6. A method of medical diagnostic imaging, the method comprising:

generating electronic data values which are indicative of an internal volumetric region of a patient, the internal volumetric region including anatomical structures which are identified by characteristic electronic data values, interfaces between adjacent anatomical structures defining interior surfaces;

determining points on one of the interior surfaces of the internal volumetric region which are visible from a viewing plane by electronically comparing the electronic data values with the characteristic electronic data values;

for each determined surface point, electronically determining a variation in the electronic data values along each of a plurality of axes;

for each determined surface point, generating an array of an electronic variance values indicative of variance in the electronic data values relative to the axes;

determining a direction of most rapid electronic variance value change for each electronic variance value array;

electronically determining an electronic shading value for each determined surface point in accordance with a normalized vector along the direction of greatest change;

converting the electronic shading values into a human-readable two dimensional display.

7. The method as set forth in claim 6 wherein the variance array generating step includes electronically determining a mean along each axis.

8. The method as set forth in claim 6 wherein the variance array generating step includes electronically setting up an electronic covariance matrix in computer memory in which matrix values along its diagonal are indicative of variance along each of the axes and values of the matrix off the diagonal are indicative of variance relative to a plurality of axes.

9. The method as set forth in claim 8 wherein the direction of most rapid variance along the covariance matrix is determined by eigenvalue decomposition of the covariance matrix which generates a primary eigenvector in the direction of most rapid variance.

10. The method as set forth in claim 9 wherein the step of determining the gray scale value includes taking a vector dot product of the primary eigenvector and a vector representing a direction of apparent illumination.

11. The method as set forth in claim 8 wherein the determination of the direction of most rapid variance through the matrix includes a least squares fit of a straight line through the matrix.

12. The method as set forth in claim 6 wherein the electronic shading value determining step includes:

determining an angle between the normalized vector and a preselected illumination direction.

13. A diagnostic imaging apparatus comprising:

an image data generating means for generating electronic image data representing a three dimensional region of a subject which three dimensional region includes at least two three dimensional substructures, each of the two substructures having differing characteristic electronic data values;

a surface determining means for determining a plurality of surface points on a portion of a surface of an interface between the substructures which interface surface portion is intersected by a plurality of rays extending orthogonal to a viewing plane;

a matrix generating means for generating an array of electronic variance values in parameter space indicative of the relative data value variance along at least three orthogonal axes for each intersected surface point;

a means for determining a direction of most rapid variance value change through the array for each intersected surface point;

a means for determining a gray scale value for each intersected surface point in accordance with the direction of greatest change;

a display means for generating a two-dimensional image display in which each pixel the two-dimensional display has the gray scale value determined for a corresponding intersected surface point.

14. The apparatus as set forth in claim 13 wherein the matrix generating means includes a means for determining a mean variance along each of the axes.

15. The apparatus as set forth in claim 13 wherein the matrix generating means includes a means for determining a covariance matrix in the parameter space in which the electronic variance values along a diagonal of the matrix are indicative of variance along each of the axes and the electronic variance values of the matrix off the diagonal are indicative of variance relative to a plurality of axes.

16. The apparatus as set forth in claim 15 wherein the means for determining the direction of most rapid variance includes an eigenvalue decomposition means for performing an eigenvalue decomposition of the covariance matrix.

17. The apparatus as set forth in claim 16 wherein the gray scale determining means includes a means for generating a vector dot product of a primary eigenvector generated by the eigenvector decomposition means and a vector identifying a direction of apparent illumination.

18. The apparatus as set forth in claim 15 wherein the means for determining the direction of most rapid variance includes means for performing a least squares fit of a straight line through the parameter space.

* * * * *